(No Model.) 2 Sheets—Sheet 1.
G. C. THOMPSON.
FRUIT PICKER.
No. 363,437. Patented May 24, 1887.
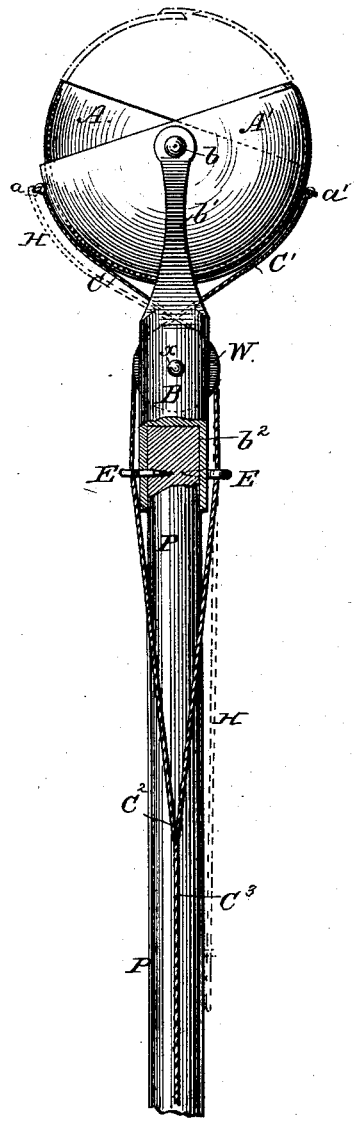
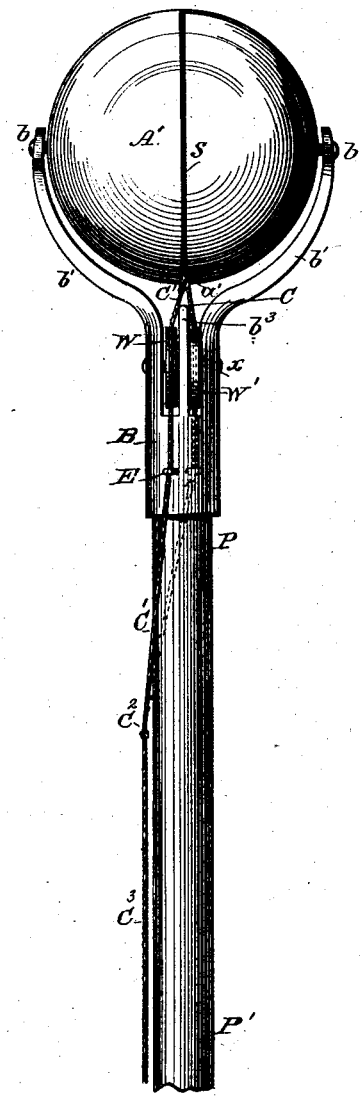
WITNESSES:
Fred G. Dieterich
Edw. W. Byrn.
INVENTOR:
Geo. C. Thompson
BY Munn & Co
ATTORNEYS.

(No Model.) 2 Sheets—Sheet 2.
G. C. THOMPSON.
FRUIT PICKER.
No. 363,437. Patented May 24, 1887.
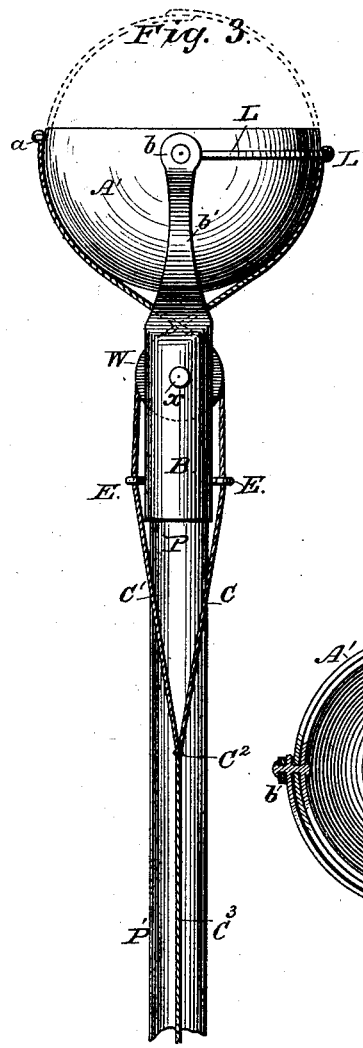
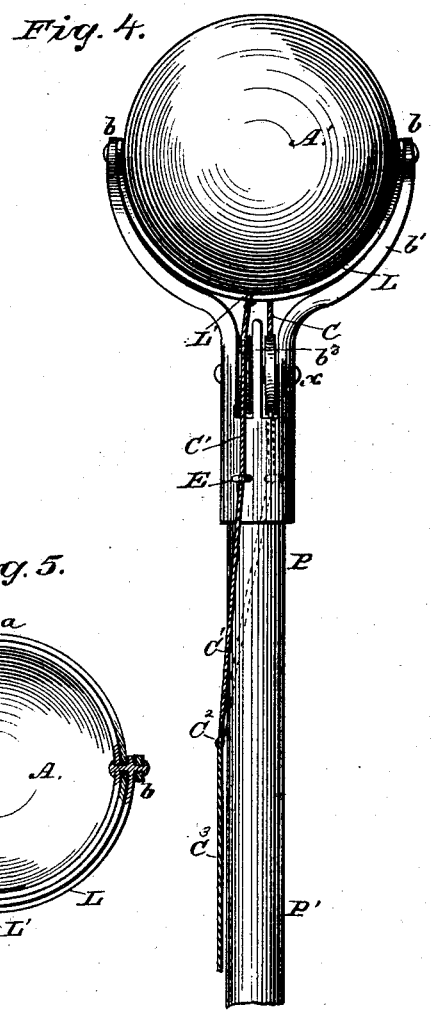
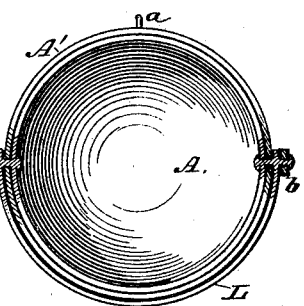
WITNESSES:
Fred G. Dieterich
Edw. W. Byrn
INVENTOR:
Geo. C. Thompson
BY Munn & Co.
ATTORNEYS.

# UNITED STATES PATENT OFFICE.

GEORGE C. THOMPSON, OF DARIEN, GEORGIA.

FRUIT-PICKER.

SPECIFICATION forming part of Letters Patent No. 363,437, dated May 24, 1887.

Application filed July 1, 1886. Serial No. 206,852. (No model.)

*To all whom it may concern:*

Be it known that I, GEORGE C. THOMPSON, of Darien, in the county of McIntosh and State of Georgia, have invented a new and useful Improvement in Fruit-Pickers, of which the following is a specification.

My invention is in the nature of a device for picking oranges, but which is equally adapted for picking apples, peaches, pears, and other similar fruit. Oranges grow in thick clusters, the fruit often touching; hence no picker that expands or spreads out laterally in opening can get to the fruit in close clusters and separate one to pick from a bunch. Pickers having bags or net-work are equally ineffective, by reason of the difficulty of the entanglement of the same in the thick boughs and foliage and the long sharp thorns that grow upon the trees.
My invention is made with reference to the avoidance of these difficulties; and to that end it consists in the peculiar construction and arrangement of parts, which I will now proceed to describe with reference to the drawings, in which—

Figure 1 is a side elevation of the picker partly opened. Fig. 2 is a view at right angles to that shown in Fig. 1, the picker being closed. Figs. 3 and 4 are views, similar to Figs. 1 and 2, of a modification of the picker; and Fig. 5 is a plan view of such modification.

Like letters of reference refer to like parts.

Referring to Figs. 1 and 2, A is a spherical cup fitting into the larger cup A', both of which are a little more than hemispheres, allowing the sharpened edges to pass each other, as shown in dotted lines. These cups are pivoted in the upper ends of the forks or prongs $b'\, b'$ at the points $b\, b$. The prongs $b'\, b'$ are cast solid with the tubular holder B, which has in its upper end an open slot for the friction-wheels W W', and a central partition, $b^3$, to prevent the cords from wearing against each other. The tubular holder B has a socket, $b^2$, in its lower end to receive the rod P P'. The rod is held in the socket by the screws E, which have rings or eyes to guide the cords C C'. The outer cup, A', has a longitudinal slot, $s\, s$, dividing the cup into two quarters of a sphere, except the strips around the rim. In this slot $s\, s$ works the ring $a'$, to which the cord C' is fastened. This ring $a'$ is rigidly attached to the inner cup, A. The ring $a$ is attached to the outer cup, A', and forms a fastening for the cord C. The cords C and C' cross each other, and, passing over the friction-wheels W W' and down the sides of rod P, they unite at $C^2$ with the cord $C^3$, which passes down the rod to the hand.

Referring, now, to the modification shown in Figs. 3, 4, and 5, instead of the open slot $s$ $s$ there is the semicircular lever or rigid bail L L, which consists of a wire bent so as to conform to the outer surface of large cup A', and rigidly attached to the pivots $b\, b$, which pivots are rigidly attached to the inner cup, A. The cord C' is fastened to the lever L L at L', instead of the ring $a'$, as in Fig. 1. The cord C is attached to the ring $a$ of the outer cup, A', the same as in Fig. 1. The inner cup is worked by means of the rigid lever L L without the open slot $s\, s$, which weakens the cup A'. In the modified form the cup A will have to be made heavier to counterbalance the weight of lever L L; or said lever can have opposite lugs to counterbalance its weight.

The normal condition of the picker is open, as in Fig. 3, its weight being so disposed as to cause it to hang in this position. In Fig. 1 it is three-fourths open. In Figs. 2 and 4 it is closed. In Fig. 5 it is open, looking down. To operate the picker, hold the staff P in the left hand or in both, place the open cup directly under and partly surrounding the fruit to be plucked, pull the cord $C^3$ with a slight but sudden jerk, and the cups A and A' will encircle the orange, separating it from the cluster and cutting its stem.

To discharge the fruit, hold the cups closed by cord $C^3$ till the picker is down to the ground or basket; then release cord $C^3$, when the cups will fall open, and by a twist of the rod to right or left the fruit will fall out.

The fruit can be gathered more rapidly by placing a net or cloth under the tree to prevent bruising by falling, and then when the fruit is clipped it can be discharged immediately without taking down the picker by means of an extra cord. (Indicated by the dotted line H H H in Fig. 1.) This line will be attached to the inner cup, A, at $a$. By releasing cord $C^3$ and pulling cord H H the cups will turn over and discharge the fruit, which will fall to the net below.

It will thus be seen that the two hemispherical cups, alternately nesting or fitting into each other when open and closing to form a hollow spherical chamber, permit the fruit to be picked from clusters without defeating its own purpose by expanding or spreading out to occupy a greater space when opened. As both cups are pivoted, it will be seen, also, that the picker will work at any angle from a horizontal position to a vertical. There are also no springs to weaken or break, and the force of the cut can be regulated by the hand to suit the toughness of the stem. The device is also simple and inexpensive and the parts easily replaced. It is also very light, and can be used with rapidity in picking.

Having thus described my invention, what I claim as new is—

1. A fruit-picker consisting of two pivoted hemispherical cups arranged to nest together or pass one into the other, combined with pull-cords for closing them to a spherical form, and a forked handle, substantially as and for the purpose described.

2. A fruit-picker consisting of two pivoted hemispherical cups arranged to nest together, and the outer one being slotted at $s$, as described, and the inner one provided with ring $a'$, in combination with pull-cords connected to the same for closing them, and a forked handle, as set forth.

3. The tubular holder B, formed with branches or forks $b'$ $b'$ and with sheave-slots and sheaves between them, in combination with the pivoted cups and the pull-cords, substantially as and for the purpose described.

4. The tubular holder B, provided with branches $b'$ $b'$, with sheave-slots and sheaves between them, and with a socket at its lower end, in combination with the pivoted cups, the handle P, the cords C C', and the screw-eyes $b^2$, serving both to connect the handle to the socket and to guide the cords, as described.

GEORGE C. THOMPSON.

Witnesses:
JAMES B. McINTOSH,
T. B. BLOUNT.